(12) United States Patent
Zheng et al.

(10) Patent No.: US 7,056,545 B2
(45) Date of Patent: *Jun. 6, 2006

(54) STABILIZATION OF AROMA-PROVIDING COMPONENTS

(75) Inventors: Ying Zheng, Dublin, OH (US); Pu-Sheng Cheng, Dublin, OH (US); Christian Milo, Epalinges (CH)

(73) Assignee: Nestec S.A., Vevey (CH)

( * ) Notice: Subject to any disclaimer, the term of this patent is extended or adjusted under 35 U.S.C. 154(b) by 247 days.

This patent is subject to a terminal disclaimer.

(21) Appl. No.: 10/661,388

(22) Filed: Sep. 11, 2003

(65) Prior Publication Data

US 2004/0076737 A1 Apr. 22, 2004

Related U.S. Application Data

(63) Continuation of application No. PCT/EP02/02866, filed on Mar. 13, 2002.
(60) Provisional application No. 60/278,506, filed on Mar. 23, 2001.

(51) Int. Cl.
*A23L 1/22* (2006.01)

(52) U.S. Cl. ............... 426/534; 426/312; 426/535; 426/537; 426/650

(58) Field of Classification Search ............ 426/312, 426/534, 535, 536, 537, 538, 650, 654
See application file for complete search history.

(56) References Cited

U.S. PATENT DOCUMENTS

| | | | |
|---|---|---|---|
| 2,892,718 A | 6/1959 | Stone ............... | 99/48 |
| 3,421,906 A | 1/1969 | Reich et al. ........... | 99/152 |
| 3,482,987 A | 12/1969 | Pitchon et al. .......... | 426/460 |
| 3,540,889 A | 11/1970 | Clinton et al. .......... | 99/71 |
| 4,287,995 A | 9/1981 | Moriya ............... | 215/228 |
| 4,378,380 A | 3/1983 | Scarpellino et al. ...... | 426/533 |
| 4,539,216 A | 9/1985 | Tse ................. | 426/597 |
| 4,897,273 A | 1/1990 | Kotaki et al. ........... | 426/118 |
| 5,182,194 A | 1/1993 | Kerkenaar et al. ........ | 435/130 |
| 5,364,555 A | 11/1994 | Zenner et al. .......... | 252/188.28 |
| 5,578,470 A | 11/1996 | Kerkenaar et al. ........ | 35/130 |
| 5,888,562 A | 3/1999 | Hansen et al. .......... | 426/45 |
| 5,922,380 A | 7/1999 | Takihara et al. | |
| 6,319,537 B1 | 11/2001 | Cheng et al. ........... | 426/594 |
| 2001/0008647 A1 | 7/2001 | Belrhlid et al. ......... | 426/535 |

FOREIGN PATENT DOCUMENTS

| | | |
|---|---|---|
| CN | 1109277 | 4/1995 |
| EP | 0 277 688 | 8/1988 |
| EP | 0328336 | 8/1989 |
| EP | 0861596 | 9/1998 |
| EP | 0 934 702 | 8/1999 |
| EP | 0 963 706 | 12/1999 |
| GB | 640241 | 7/1950 |
| HU | 44914 | 5/1988 |
| JP | 62278948 | 12/1987 |
| JP | 08182486 | 7/1996 |
| JP | 08196212 | 8/1996 |
| WO | WO9518540 | 7/1995 |
| WO | WO9611861 | 4/1996 |
| WO | WO00/69274 | 11/2000 |

OTHER PUBLICATIONS

Holscher, W. et al, XP008007644, "Investigations of Roasted Coffee Freshness With An Improved Headspace Technique–Aromafrische Mittles Einer Vergesserten Headspace–Methodik", Forschung, vol. 195, no. 1, 1992, pp. 33–38.

Semmelroch, P. et al., XP000602989 " Analysis of Roasted Coffee Powders And Brews By Gas Chromatography–Olfactometry of Headspace Samples" Lebensmittel Wissenshaft Und Technologies, vol. 28, no. 3, 1995, pp. 310–313.

*Primary Examiner*—Leslie Wong
(74) *Attorney, Agent, or Firm*—Winston & Strawn LLP

(57) ABSTRACT

A process for stabilizing an aroma-providing component such as coffee aroma against loss or degradation of desirable flavor or sensory characteristics of its aroma during storage. The aroma-providing component is associated with a stabilizing agent in an amount effective to chemically interact with undesirable compounds to form a stabilized aroma-providing component which (a) retains a significant portion of one or more of the desirable flavor or sensory characteristics of the aroma in the aroma-containing component during storage, or (b) reduces off flavor generation during storage of the aroma-providing component. The stabilizing agent preferably is a nucleophile that contains sulfur or nitrogen, such as sulfur dioxide, sulfites, compounds that contain or generate thiols, amines or amino acids, cysteine, gluathione or an enzyme. The stabilized aroma-providing component retains the desirable flavor and sensory characteristics of the aroma for a time period of at least six months to one year or longer.

17 Claims, No Drawings

STABILIZATION OF AROMA-PROVIDING COMPONENTS

CROSS REFERENCE

This application is a continuation of the U.S. National Stage designation of International Application PCT/EP02/02866 filed Mar. 13, 2002, the content of which is expressly incorporated herein by reference thereto, and claims priority to U.S. provisional application Ser. No. 60/278,506, filed Mar. 23, 2001.

FIELD OF INVENTION

The invention relates to a process for stabilizing an aroma-providing component of a beverage or foodstuff so that loss or degradation of the flavoring, taste, or other desirable sensory characteristics of the component is inhibited or minimized, and to the stabilized aroma-providing component that is obtained by this process. Suitable aroma-providing components include chocolate aroma, tea aroma, Malliard reaction flavor and preferably coffee aroma.

BACKGROUND OF THE INVENTION

Flavoring components are utilized in a wide variety of food and beverage products to impart, provide, modify, or enhance the flavor or taste to the product. Such components are often isolated or extracted from various natural materials. When these components are extracted from plants, the flavor and taste characteristics of such components can deteriorate or degrade over time, thus reducing the desirable taste, flavor, or sensory properties of products to which these components are added.

For example, coffee aroma is utilized in a wide variety of products, including instant coffee and ready to drink coffee beverages as well as coffee flavored foods such as ice cream, baking products, or candy. But coffee aroma is known to be very unstable. As coffee aroma degrades, it generates unpleasant and non-coffee-like notes that are undesirable. This degradation substantially reduces the perceived quality of the product. A particular problem is in the storage life of coffee concentrates.

For this reason, special attention must be paid to the storage of flavoring components such as coffee aroma. It has been found that the shelf life of a coffee product can be substantially improved by holding or retaining the coffee aroma separately from the from the coffee solids during storage and then combining these components immediately prior to the preparation of the beverage for consumption. This is described in U.S. Pat. No. 6,319,537. Although this separate storage technique reduces the amount of degradation of the coffee aroma during storage, some degradation still occurs and the final combined product may yet contain non-coffee flavors that detract from the perception of quality in the final product.

The prior art recognizes that various flavor protective agents can be added to food or beverage products in order to preserve, maintain, or improve the flavor characteristics of such products over time. It is well known in the art that sulfites can be added to beverages such as beer or wine to preserve the flavor of such beverages. Generally, sulfites act as antioxidants to prevent deterioration of the flavor. For example, sulfites can react with oxygen to prevent deterioration of the flavor of the product due to oxidation of the flavoring component.

Also, Japanese patent application 08/196212 discloses the addition of a sulfite to a coffee beverage when liquid is added to reconstitute the beverage. This is not very effective as the sulfite simply dissolves in the beverage without significantly enhancing or preserving the aroma because the sulfite is added into the whole food matrix and is integrated therein.

Instead of adding the sulfites directly to food products, U.S. Pat. No. 4,536,409 discloses that sulfites may be incorporated into the packaging to prevent absorption of oxygen into the packaged food. Again, oxidation of the flavor component is reduced so that the desired flavor of the food is retained for a longer period of time.

U.S. Pat. No. 3,540,889 discloses that methyl mercaptan can be added to an aqueous extract of soluble coffee solids prior to drying the extract to a stable moisture content for improving the flavor of this extract when it is reconstituted as a coffee beverage.

Despite these disclosures, there still remains a need for stabilization of volatile flavoring components in order to preserve their ability to impart the desired flavor, taste, and other sensory characteristics to foods to which they are added. The present invention now provides a number of practical solutions that satisfy this need.

SUMMARY OF THE INVENTION

The invention relates to a process for stabilizing an aroma-providing component against loss or degradation of desirable flavor or sensory characteristics of its aroma during storage. The method comprises associating the aroma-providing component with a stabilizing agent in an amount effective to chemically interact with undesirable compounds to form a stabilized aroma-providing component which (a) retains a significant portion of one or more of the desirable flavor or sensory characteristics of the aroma in the aroma-providing component during storage, or (b) reduces off flavor generation during storage of the aroma-providing component.

The stabilizing agent is preferably a compound that contains at least one atom having at least one lone pair of electrons and is present in an amount sufficient to react with undesirable reactive compounds associated with the aroma-providing component. The compound advantageously contains at least one atom of sulfur, nitrogen, oxygen or carbon and is generally present in an amount of between about 1 and 50,000 ppm.

The stabilizing agent should be present in an amount sufficient to react with additional compounds in the aroma-providing component to generate one or more aroma compounds that contribute to the desirable flavor or sensory characteristics of the aroma or that mask off flavors in the aroma-providing component. For example, when the additional compounds contain disulfide bonds, the stabilizing agent can cleave such bonds to generate thiols that contribute to the desirable characteristics of the aroma. When the undesirable compounds generate or comprise free radicals, the stabilizing agent can be present in an amount sufficient to reduce generation of or scavenge such free radicals.

Preferred stabilizing agents include $SO_2$, a sulfite or a compound that contains a thiol, an amine or an amino acid. The stabilizing agent may comprise cysteine or glutathione or their salts, or it may be an enzyme. Also, an antioxidant may be provided with the stabilizing agent to reduce or prevent oxidation of compounds that provide the desirable flavor or sensory characteristics of the aroma.

Suitable aroma-providing components for stabilization according to the invention include chocolate aroma, tea aroma, reaction flavor (such as a Maillard reaction flavor) and most preferably coffee aroma. For these, the stabilizing agent is added in an amount sufficient to react with some or all of the carbonyl groups present in compounds associated with those aromas to reduce or inhibit pyrrole loss or to reduce or inhibit degradation of thiols, thus retaining the desirable flavor or sensory characteristics during at least six months of storage.

The stabilized aroma-providing component can be provided in a number of different forms, including as a gas, solid, or liquid. The preferred forms are as a liquid or a powder that is stored until a later time when it is reconstituted for consumption, e.g., by the addition of a diluent liquid.

The stabilizing aroma-providing component can be prepared by a number of different processes. The stabilizing agent can be incorporated into a material that is added to the aroma-providing component during storage. For example, the stabilizing agent can also be combined it with another additive, such as a solid or liquid carrier, before being associated with the aroma-providing component. Preferred carriers include solvents, oils, emulsions, flavoring agents, carbohydrates, proteins, or antioxidants. The stabilized aroma-providing component can also be formed by passing the aroma-providing component through a porous membrane, film or paper material that contains and releases the stabilizing agent into the aroma component, or the stabilizing agent can simply be added to the aroma-providing component during processing or storage.

In a preferred embodiment, the stabilized aroma-providing component is stored separately from a food, beverage, food-forming or beverage-forming material until preparation for consumption of a food or beverage product that exhibits the desirable flavor or sensory characteristics of the aroma. The food or beverage product is preferably prepared by combining these components with a liquid. It is also possible to dry this liquid product to obtain a solid material that retains the initial flavor or sensory characteristic of the aroma for a time period of at least six months during storage of the powder. This is accomplished by providing the solid material as a powder by spray-drying or freeze-drying the liquid product.

DETAILED DESCRIPTION OF THE INVENTION

As used herein, the term "aroma-providing component" means a compound or other component that is added to other food or beverage-forming components to form a final product for consumption. The aroma providing component may be isolated, concentrated, or separated from other food or beverage forming components prior to treatment, and is added back after the stabilizing treatment. The aroma providing component is then capable of providing a more desirable aroma when a food or beverage product is prepared. Typically, aroma providing components of the invention include an aroma such as coffee aroma, chocolate aroma, cocoa, malt, tea aroma, or Maillard reaction products thereof, or any combination thereof.

As used herein, the term "storage" means the retention of a component or product in final form after preparation of same until purchase by consumers. Generally, storage times are on the order of at least 1–3 months, typically at least six months and as long as one year.

As used herein the term "significant portion" is defined as an amount of a desirable aroma, flavor or other organoleptic characteristic that can be sensed or perceived by one who consumes a food or beverage product to which an aroma-providing ingredient according to the invention has been added or incorporated.

As used herein, "coffee aroma" is defined to be the volatile flavor and aroma compounds that are present in coffee products such as roast coffee or coffee extracts. Thus, the invention provides a method to stabilize coffee aroma by contact with one or more of the stabilizing agents described herein so as to reduce or prevent degradation or loss of the coffee aroma over time. These stabilizing agents can also be utilized to delay or control the release of the aroma after the beverage is prepared for consumption. All these effects whether alone or together result in the perception, by the consumer, of a more desirable beverage, e.g., one that maintains a preserved fresh, roasty aroma and flavor over the entire time that the beverage is being consumed rather than just upon initial preparation of the beverage.

As used herein, the term "desirable flavor or sensory characteristics" refer to the flavor, aroma, or other organoleptic properties of a food or beverage product that is reminiscent of a freshly prepared product for consumption.

As used herein, the term "undesirable compounds" refer to the volatile compounds in of a aroma-providing component that promote the degradation of the useful volatile compounds that contribute to desirable flavor or sensory characteristics to.

The association of a stabilizing agent with an aroma-providing component results in a stabilized aroma-providing component that has number of advantages. First of all, deleterious compounds that are normally present with the aroma-providing component react complex, or are scavenged by the stabilizing agent. Also, compounds that can detract from the desirable flavor or sensory characteristics also react or form adducts or complexes with the stabilizing agent. Finally, desirable compounds are often released by such reactions. In addition to removing or masking undesirable compounds, the increased amounts of desirable compounds enhances the perceived freshness and desirability of the food or beverage from which the aroma emanates. Generally, these detrimental components are carbonyl groups contained in compounds such as aldehydes or ketones. The stabilizing agent reacts with these carbonyl groups to form adducts which do not react with the other aroma-providing components to decrease the overall flavor characteristics. The proportion of adducted carbonyls ranges from 10% to 100% of total carbonyls, and the pyrroles and methane thiol are retained at more than about 30% of their initial concentrations during 6 months to one year storage of the aroma at ambient temperature. The preferred stabilizing agents also act as or include anti-oxidants or oxygen/free radical scavengers to prevent deterioration of the flavor characteristics of the coffee aroma due to oxidation from oxygen, free radicals or other oxidizing compounds. The preferred agents can also cleavage disulfide bond to promote levels of thiols that are then preserved by the endogenous antioxidant activity. All together, they ensure the quality of the resulting products to be not only more roasty/sulfury and less woody/green/groundsy/processey but also more stable over time.

While the most preferred aroma is coffee aroma, the aroma-providing component in this invention is intended to be a generic definition of all types of aromas, including those aromas in aqueous or water, oil, emulsion, forms, as well as those which are encapsulated, and the like. Specific mention can be made of chocolate or cocoa aroma, tea aroma, malt, Maillard reaction flavor, or other aromas that are derived from or recovered after roasting or cooking of a raw material, foodstuff or other compounds.

The principles of the invention are now illustrated for the preferred embodiments where coffee aroma is disclosed as the most preferred aroma-providing component. Coffee aroma is used for a flavoring agent for various foods or beverages and particularly in soluble coffee, coffee concentrate and ready to drink coffee beverages to enhance the flavor, taste, and other sensory characteristics of these beverages.

There are a number of known methods for obtaining coffee aroma, and any can be utilized in this invention. Typical methods include, but are not limited to, standard instant coffee processing in which stripping, gas flushing, or other methods are used to generate and recover the aroma, the collection of gases from the grinding, heating, cooking, or other processing steps, or the extraction of the aroma from any of the processing liquids. Extraction techniques include, but are not limited to, liquid/liquid extraction, $CO_2$ extraction, oil extraction, stripping, distillation, fractionation, flashing, or gas flushing of the processing liquid to obtain the aroma.

As noted above, there are a number of different stabilizing agents that can be used in this invention. These agents can be used alone or in combination. Also, a single agent can be applied to the aroma-providing component at different or multiple times. These agents generally include any compounds that include one or more atoms that have at least one set of unpaired electrons. Typical atoms that have this property are sulfur or nitrogen although others can be used if desired. The properties of those atoms are commonly defined and known. Preferred stabilizing agents include sulfur dioxide ($SO_2$), sulfites, and compounds that generate or contain thiols, amines, or amino acids. Specifically preferred compounds include any FDA generally regarded as safe (GRAS) sulfiting agent, such as $SO_2$, sodium and potassium sulfites, sodium and potassium metabisulfites, or sodium or potassium bisulfites. Sulfur containing amino acids, such as cysteine, homocysteine and their salts, whether used alone or in peptides or proteins, are also advantageous, as is glutathione. Materials that contain or generate sulfites or thiols, such as yeasts or yeast extracts, can also be used.

Nucleophiles such as sulfite and cysteine react reversibly and selectively with carbonyls. In addition, sulfites and cysteine are a good antioxidants and free-radical scavengers. They also react with disulfides to generate free thiols. Such thiols can also impart desirable roasty coffee notes to the aroma or can be used to mask coffee negative notes such as woody, processey or groundsy notes and even stale or oxidized notes of stored products. Due to these endogenous antioxidant activities, the degradation of thiols and pyrroles are reduced or inhibited. As thiols provide a desirable roasty, nutty note to the aroma, the retention of thiols in the aroma is beneficial.

Generally, depending upon the type of stabilizing agent, it is associated with the flavoring component so that the compound is present in an amount of about 1 ppm to 50,000 ppm in the flavoring component. A most preferred agent is sodium sulfite. Depending on the concentration of the flavoring component, it is used at a level of about 500 ppm to 1,000 ppm when 80 grams of aroma distillate is isolated from 100 grams of R&G coffee; or between about 4000 to 8000 ppm when 10 grams of aroma distillate is produced from 100 grams of roast and ground ("R&G") coffee. The ratio of stabilizing agent to flavor compounds (based on pure organic compounds measured in this art) may be in the range of about 0.1:1 to 32:1 and is preferably about 2:1 to 20:1.

The aroma concentration and its constituents are determined by a conventional analytical method. Generally, a headspace volatile profile was completed using a CDS 6000 purge and trap device, an Archon purge and trap autosampler device, and a HP 6890 GC/HP 5973 MS. The purge and trap procedure involves bubbling an inert gas (helium) through a distillate sample at ambient temperature allowing the volatile components to be efficiently transferred from the aqueous phase to the vapor phase. The vapor is swept through a Tenax column (CDS analytical part no. 30E35063), where the volatile components are trapped. The trapped components are rapidly heated and back-flushed with helium to desorb the volatile analytes onto a cryogenic focusing module. The cryogenic focusing module is rapidly heated to desorb the volatile analytes onto a gas chromatographic. The gas chromatographic column is heated to elute the components, which are detected with a HP 5973 mass spectrometer. The aroma compounds is measured as ppm equivalent of methylbutyrate.

The addition of the stabilizing agent has been found to extend the shelf life of coffee aroma so as to allow the aroma, after storage for extended periods of time, to retain a flavor which is reminiscent of freshly brewed coffee in various coffee beverages that are reconstituted after storage of the aroma. Without being bound by theory, it is believed that several mechanisms are occurring to achieve the stability and increased storage life of the fresh flavor, with one or a combination of these mechanisms occurring simultaneously to achieve the improvements:

the stabilizing agent reacts with carbonyl groups contained in compounds such as aldehydes or ketones to form adducts which do not react with the other coffee aroma compounds to decrease the overall flavor characteristics;

the stabilizing agent cleavages disulfide bonds to promote levels of desirable free thiols; or the stabilizing agent acts as an oxygen scavenger to prevent deterioration of the flavor characteristics of the coffee aroma due to oxidation; or the stabilizing agent acts as an anti-oxidant to prevent free radicals and other oxidizing compounds from deteriorating the flavor characteristics of the aroma due to oxidation; or these endogenous antioxidant activities preserve thiol and pyrrole degradation over time; or the stabilizing agent reduces or controls undesirable browning, polymerization, or condensation reactions; or.

The stabilizing agent binds carbonyls during storage at least some or all of which are released upon reconstitution into beverage.

In addition, the presence of aldehydes, such as acetaldehyde, causes the flavors to degrade. The stabilizing agent reacts with the aldehyde to form aldehyde derivatives that do not negatively impact the stability of the coffee aroma-providing component. For this reason, C-nucleophiles, such as 1,3-dicarbonyl compounds and various thiazolium salts are particularly useful stabilizing agents. For example, thiamin (Vitamin B1) is known to react with aldehydes to form aldehyde derivatives that do not deleteriously affect the coffee-aroma providing component.

In conventional non-treated or non-stabilized coffee aroma, the amounts of methanethiol and pyrrole typically degrade or diminish to almost undetectable levels over the course of several months when the components are stored at room temperature. Even if the stabilizer is added to the final product that contains a non-stabilized aroma providing component, these volatiles are substantially degraded because the stabilizer is added to the whole food matrix and is integrated therewith so that less of it is available to interact with the aroma-providing component. In contrast, the treated or stabilized aroma-providing components of the invention are characterized by a significantly reduced degradation profile compared to the conventional components. The methane thiol and pyrrole levels remain at more than 30% of the initial levels after storage at ambient temperature over a period of at least 6 months.

A shelf storage study of coffee aroma with the use of sodium sulfite as a stabilizing agent has shown that a significant amount of carbonyls (aldehydes and ketones) were bound with the sulfite to become non-volatile and thus absent from the headspace of a container that contained coffee aroma distillate. Also, a significant increase of methanethiol was detected after sulfite addition. After one-year ambient temperature storage, two of the most reactive groups of coffee aroma compounds, pyrrole and thiols, were preserved to a level of more than 80%.

To illustrate the effect of a stabilizing agent on coffee aroma, 1 g of sodium sulfite was added to 1000 g of coffee aroma distillate, the ingredients were mixed and then placed into a sealed bottle. The amounts of various compounds in the head space of the bottle was determined before addition of the sulfite and again after two days. The results show that upon treatment the initial amount of aldehyde and diketone compounds decreased by about 40% each while the amount of thiol compounds increased and the amount of pyrrole compounds remained the same over that period. As the thiols provide a desirable roasty note to the aroma, the presence of a greater amount of these compounds imparted a more roasty note to the aroma. The maintenance of the pyrroles also provided a nutty note to the aroma. Finally, undesirable flavors were reduced due to the lower amounts of aldehydes and diketones.

Also, a comparison of these compounds after 6 months storage of the stabilized aroma-providing component was found to be as shown in Table I:

TABLE I

Headspace Aroma Concentrations in Coffee Aroma Distillate

| | Storage time (months) | Control (stored at 20 C.) | Frozen (stored at −40 C.) | Sulfite (stored at 20 C.) |
|---|---|---|---|---|
| Pyrrole | 0 | 0.63 | 0.63 | 0.60 |
| | 2 | 0.00 | 0.53 | 0.65 |
| | 6 | 0.00 | 0.34 | 0.59 |
| Aldehydes | 0 | 5.94 | 5.94 | 3.33 |
| | 2 | 6.40 | 5.65 | 3.73 |
| | 6 | 5.33 | 5.19 | 3.54 |
| Diketones | 0 | 0.83 | 0.83 | 0.46 |
| | 2 | 0.94 | 0.82 | 0.49 |
| | 6 | 0.80 | 0.81 | 0.46 |
| Methanethiol | 0 | 1.73 | 1.73 | 1.81 |
| | 6 | 0.00 | 1.35 | 1.93 |

Table II shows the long term storage effect of the preferred sodium sulfite stabilizer on coffee distillate by comparing data taken at 2 months and 12 months after storage.

TABLE II

Headspace Aroma Concentrations in Coffee Aroma Distillate

| | Storage time (months) | Control (stored at 20 C.) | Frozen (stored at −40 C.) | Sulfite (stored at 20 C.) |
|---|---|---|---|---|
| Pyrrole | 2 | 0.05 | 0.44 | 0.40 |
| | 12 | 0.00 | 0.21 | 0.39 |
| Aldehydes | 2 | 7.49 | 7.92 | 1.58 |
| | 12 | 7.0 | 7.4 | 1.19 |
| Diketones | 2 | 0.93 | 1.08 | 0.44 |
| | 12 | 0.96 | 0.99 | 0.34 |
| Methanethiol | 2 | 0.47 | 1.49 | 1.93 |
| | 12 | 0.15 | 1.28 | 1.90 |

Note - Units are ppm methylbutyrate equivalent per 1 g roast and ground coffee except in ppb methylbutyrate equivalent per 0.5 g roast and ground coffee for methanethiol.

The results show that the frozen aroma lost only half as much pyrrole as did the control, bud the stabilized aroma maintained pyrrole levels. Finally, the frozen aroma lost only 15% in methanethiol compared to a loss of about 67% for the control, while the stabilize aroma showed no change.

Thus, the stabilized aroma-providing components of the invention are characterized as having the following contents of volatile compounds:

Pyrroles: essentially all retained after 1 month: at least about 60 to 90% retained after 3 months and at least 30 to 50% of original retained after 1 year storage, or Thiols: at least as much as or more that original amount after 1 month; greater that 60 to 90% after 3 months with more than 40 to 50% of original retained after 1 year storage, or Aldehydes and ketones: removed or bound by at least about 30% and up to as much as 50 to 90% from the original amount at all relevant measurement time periods.

Instead of sulfites, other compounds that contain or release thiols, amines or amino acids can be utilized, As noted herein, cysteine and glutathione are useful stabilizing agents although they are not as effective for longer storage times. These amino acids can be used added in the form of peptides or proteins that contain them.

Also, various enzymes, and preferably those that react with carbonyls, may also be used as stabilizing agents. For instance acetaldehyde may be enzymatically converted to ethanol using an alcohol dehydrogenase, thereby reducing or eliminating the reactive aldehyde that can degrade the flavoring components. One way to perform this reaction is to add an enzyme and its cofactor. Another class of enzymes, known as transketolase enzymes, use thiamine pyrophosphate as cofactor and catalyzes the transfer of activated aldehydes to an aldehyde receptor resulting in ketose-sugars. The aldehydes may be partially transformed into acyloins or blocked by the nucleophilic attack of the thiazolium-ring, depending on the reaction conditions. The thiamin reaction proceeds as follows:

components. Instead of pure enzymes, extracts of yeast may also be utilized and are preferable due to their low cost. Polymer supported systems may also be used in place of the enzymes and their required cofactors.

The stabilizing agent may be associated with the aroma-providing flavoring component by any one of a variety of methods. The aroma or aroma distillate itself can simply be contacted with the stabilizing agent at the amounts stated herein to form a mixture with the stabilizing agent. When sulfites are used, an appropriate dosage range would be that which provides about 1 ppm to 50,000 ppm of sulfite per unit weight of aroma or aroma distillate. Preferably, the ratio of sodium sulfite to aroma volatile compounds is preferably from about 2:1 to 20:1. Depending upon the specific stabilizing agent used, these amounts can vary but the optimum amounts can be readily determined by one of ordinary skill in the art through routine testing.

Alternatively, the stabilizing agent can be associated with or added to the aroma-providing component as a powder, liquid, or as a gas.

The treated or stabilized aroma-providing component may be retained in a variety of forms. Preferably, the stabilized component is retained in a pure form and is stored separately from the food product to which it will later be added. A preferred storage embodiment for coffee aroma is disclosed in U.S. Pat. No. 6,319,537, the content of which is expressly incorporated herein by reference thereto. Of course, separate storage is useful for extending the storage life of stabilized aroma-providing components from other food or beverage items as well.

The stabilizing agent can contact the aroma-providing component in any one of a variety of methods. When the stabilizing agent and aroma-providing component are in the same form, i.e., both are solids, liquids or gases, simple mixing can be used with sufficient agitation or time provided to enable the stabilizing agent to adduct or inactivate the detrimental carbonyl containing compounds, or to scavenge

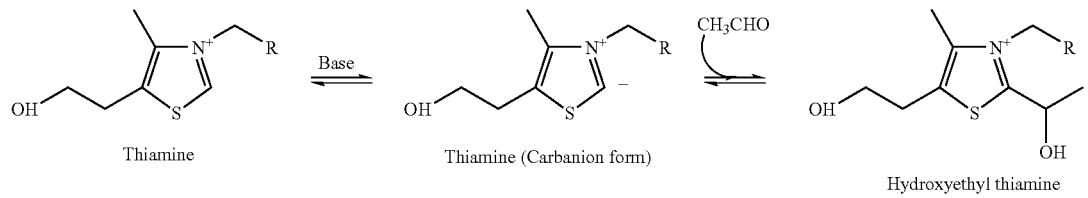

Thiamine     Thiamine (Carbanion form)     Hydroxyethyl thiamine

Thus, transketolases and pyruvate decarboxylases may also decrease the aldehyde concentration in the flavoring oxygen or other free radicals to prevent oxidation or other deterioration of the flavor characteristics of the aroma.

When the stabilizing agent and aroma-providing component are in different forms, they can be associated with each other in a way that efficiently and effectively utilizes the different forms. For example, if one is a solid or liquid and the other is a gas, a treatment chamber can be provided where the gas is bubbled through the liquid or around the solid to achieve the adducting of carbonyl groups or the scavenging of oxygen or other free radicals. The stabilized aroma-providing component can then be recovered and, in the most preferred arrangement, separately stored from the food or beverage or food or beverage forming component to which it is to be added when that component is to be prepared for consumption. When the specific gravities or other properties are sufficiently distinct, countercurrent flow processing can be used, followed by recovery of stabilized aroma-providing component.

Another desirable application of different forms of the components can be utilized when the aroma-providing component is a liquid or gas and the stabilizing agent is a solid. The stabilizing agent can be incorporated onto a porous support, such as a membrane or filter, and the aroma-providing component can be directed to pass adjacent to, around, or even through the membrane or filter. This enables the stabilizing agent to react with, scavenge or bind to the undesirable compounds in the aroma-providing agent. Typical materials for such membranes and filters include paper or permeable plastics or films into or upon which the stabilizing agent is incorporated, coated or otherwise associated. It is also possible to configure solid stabilizing agents in the form of porous materials through or around which the gaseous or liquid aroma-providing component will pass to achieve the desired adducting or scavenging results.

Alternatively and preferably, the stabilizing agent can be placed into or upon the walls of a package or container which is to be used to separately store the aroma-providing component, thus achieving the desired adducting or scavenging during storage by simply placing the aroma-providing component into the package or container wherein it can contact the stabilizing agent. The stabilizing agent can be simply placed in the compartment as a powder or liquid, it can be provided in the form of a small permeable pouch, such as a "tea bag" or other permeable enclosure, or it can be incorporated in a separate compartment which has a permeable cover to enable the aroma-providing component to contact the stabilizer therein. One of ordinary skill in the art can determine he most effective way to arrange the package or container so that the aroma-providing component and stabilizing agent can come into contact with each other. If desired, the stabilizing component can be added both to the aroma-providing component and to the package to which it is added.

It has been found that the stabilized aroma-providing component or the stabilizing agent and aroma-providing component combination can be stored at room temperature for extended periods of time without significant loss of the desirable aroma at the time when the product is made for consumption. The maintenance of the desirable notes for a period of at least six months and even longer is easily achieved for coffee aroma with similar benefits obtainable for other aromas. The stabilization of the aroma-providing component can often lead to new aroma: one that is different from the conventionally expected aroma but which is generally perceived as being superior to the conventional aroma. Stabilized coffee aroma, for example, provides more intense, more roasty notes than conventional coffee. Again, this superior aroma is maintained for a period of at least six months to one year when stored at room temperature.

For maintaining these enhanced or superior aroma characteristics for even longer times, storage at temperatures below ambient can be used. Temperatures as low as 10° C., or even 0° C. or lower can be used for this purpose. Generally, storage stability for more than one year at room temperature is sufficient for many aroma-providing components so that lower temperature storage is not necessary. The person of ordinary skill in the art can determine by routine testing the optimum storage temperature for retaining the effective aroma characteristics for the desired time periods depending upon the specific aroma-providing component, stabilizing agent, and required aroma properties after storage.

For example, consider an aroma-providing component that is not stabilized but which is stored separately from the food or beverage. This component can retain the desired aroma characteristics for a period of at least 8 to 10 weeks at room temperature compared to around three weeks for aroma-providing components that are stored with the food or beverage product. In comparison, stabilized aroma-providing products retain desirable aroma characteristics for a period of at least six months to one year or even longer.

It has also been found that the stabilized aroma-providing components of the invention provide a controlled and prolonged release of aroma after the beverage or food product is prepared for consumption. When a beverage or food product is prepared for consumption, the aroma from a stabilized aroma-providing component is not released in the same way as that from an unstabilized aroma-providing component. Depending on the nature of the aroma compound, only approximately 65% to 90% of the aroma compound is released compared to that of the unstabilized component. This reduced level of release is observed mainly for carbonyl compounds whereas thiols are released to more than 100% typically between 110 to 140%. The release is also maintained, however, for a longer period of time of at least 3 to 20 and preferably 6 to 15 minutes at 60° C. after the food or beverage is prepared for consumption, compared to a maintenance of release of only about 1 to 5 minutes for an unstabilized aroma-providing product. This contributes to the final perception that the food or beverage product has improved sensory characteristics and an improved quality to stand for a sustained time, thus providing the consumer with a more appealing food or beverage product for a significantly longer time during consumption. Depending upon the specific type of food or beverage product, as well as the specific type of stabilizing agent and stabilizing treatment time, the release of the desirable sensory characteristics of the aroma can be sustained over a period of from about 3 to 25 minutes. Obviously, larger quantities of the food or beverage product, such as a soup or entire meal, would prefer to have the longer release time for the aroma, whereas for small quantities, such as espresso coffee, it would be appropriate to utilize the shorter aroma retention time because of the shorter time it would take to consume such products.

The time of treatment of the aroma-providing component and the stabilizing agent is also a consideration. Also, the relative amounts of stabilizing agent and aroma-providing component play a factor in this. Of course, the more stabilizing agent and the longer treatment times that are used, the more carbonyl groups form adducts and the more oxygen or free radicals are scavenged. Depending upon the intended storage time and temperature, it may not be necessary to remove all of the oxygen and free radicals, nor to adduct all of the carbonyls. Again, one of ordinary skill in the art can best select the relative amounts of the components, the treatment times and the storage temperatures so that the stabilized aroma-providing component can provide the optimum flavor characteristics to the intended product at the eventual time of use.

As noted above, the stabilized aroma-providing component can be stored for a longer period of time with retention of the desirable organoleptic characteristics of the aroma. It has also been discovered that these desirable characteristics are obtainable even when the food or beverage product is prepared for immediate consumption. The addition of a stabilizing agent to coffee during preparation results in more roasty/sulfury/nutty notes and less woody/green/harsh notes in the product so that even the initial product is perceived differently than an untreated control.

The form of the stabilized aroma-providing product represents another feature of the invention. While any form can be used, components in a gaseous form present additional handling considerations. While this may present less of a problem in a commercial setting, such as a cafe or restaurant where coffee is purchased for relatively immediate consumption, it may not be as desirable for home use as the dispensation of a gas into a liquid is not trivial. For this reason, it is preferable for the aroma-providing component to be in liquid or solid form. When the final product is a liquid that is prepared by the addition of water, milk or other fluids, it is most desirable for the stabilized aroma-providing component to be in the form of a solid or liquid that renders it readily soluble in or mixable with the fluid that is used to prepare the product.

The provision of the stabilized aroma-providing component as a powder can be achieved in a number of ways. When the stabilized aroma-providing component is a liquid, it can readily be converted into a solid by conventional drying techniques such as spray drying or freeze drying using any carriers. In this regard, it is highly desirable to conduct the spray drying or freeze drying operation on a solution of stabilized aroma-providing component as soon as possible after treatment by the stabilizing agent so that as much of the aroma in the aroma-providing component can be retained. If desired, the particle size of the spray-dried or freeze-dried powder can be varied by grinding or pulverization, with the size that is most desirable being one that readily dissolves (i.e., within one minute and preferably within 15–30 seconds) after being added to the fluid used to form the consumable product.

A number of different specific beverage-forming components can be improved by being combined with the stabilized aroma-providing components of the present invention. One product is a coffee concentrate in liquid form. For example, the stabilized aroma-providing component can be added to the concentrate prior to storage or can be stored separately until the time of preparation of the beverage. Depending upon the concentration of coffee in the concentrate, it may be sufficient to treat the concentrate after addition of the aroma-providing component. This method is not as preferred as separate stabilization of the aroma-providing component.

Another product is ready-to-drink beverages. Here, the aroma-providing component is typically stabilized prior to addition to the beverage.

In products that include the stabilized aroma-providing component with a food or beverage, it is advantageous to store these products at lower temperatures, i.e., 0–10° C., since this retards the release of the desirable volatiles.

Instead of combining separately dried powders, it is within the scope of this invention to first reconstitute the food or beverage product with the stabilized aroma-providing component and thereafter quickly process the resulting product. Freeze-drying or spray-drying can be used for this purpose, and the drying step is conducted as soon as practical after reconstitution of the product. One way to do this would be to add the product forming component and stabilized aroma-providing components into a liquid in a venturi or other device that provides acceleration or mixing of the components with the fluid. Thereafter, the liquid product is spray-dried or freeze-dried to a dry powder. Again, the particle size can be controlled to the desired range or subsequent milling, grinding, pulverizing or other particle size reduction techniques can be applied. The final product can be stored at room temperature for at least six months or even longer at lower temperatures until the time when the product is to be reconstituted. At that time, the aroma is released with essentially the same properties as if the product was freshly prepared, thus providing an appealing product for consumption.

Although not wishing to be bound by theory, it is believed that the stabilization effect in the final aromatized product is effective because the drying step is conducted rapidly after mixing the stabilized aroma-providing product with the food or beverage forming component in a liquid state at low temperature, preferably 0–10° C. When the stabilized aroma-providing component is mixed with the food or beverage forming component and the reconstitution liquid, the stabilizing agent is released as the aroma is released. As noted above, this process takes between 3 and 25 minutes to complete. If the drying process is conducted within two minutes, preferably within one minute and more preferably within 5 to 30 seconds after reconstitution of the product, the aroma becomes trapped in the product for release at a later time when the product is reconstituted. This process is preferred since it avoids the use of separate drying steps for the stabilized aroma-providing component and the food or beverage component.

When prepared in this fashion, it is not necessary to retain the stabilized aroma-providing component powder separately from the solid food or beverage forming components, as the aroma characteristics are retained until a liquid or fluid such as water or milk is added to form the food or beverage. Again, the storage of the powder or powder mixture can be made at room temperature or lower, if desired, depending upon the intended time of consumption. This type of arrangement is useful for products such as cold or hot powder drinks (i.e., NESQUIK, cocoas, flavored milk powders, or fruit drink mixes); puddings; soup mixes; sauce or gravy mixes; and, of course, all types of instant or ready-to-drink coffee products. As noted herein, a significant extension of the time that desirable aroma characteristics are provided can be obtained by treating the aroma-providing component with the stabilizing component separately before combining the stabilized aroma-providing component with the food or beverage forming component. Of course, separate storage of these components provides even longer retention of the desirable aroma characteristics during storage, particularly when the stabilized aroma-providing component is stored at low (i.e., below freezing) temperatures The resulting food or beverage product, after reconstitution, is perceived to have a fresher, more desirable aroma both after the product is reconstituted as well as over the entire consumption period of, e.g., 5 to 15 minutes.

Many of the stabilizing agents disclosed herein also are effective free-radical scavengers, so that a sufficient amount of the stabilizing agent is added to also scavenge free radicals. It is also possible to assist the stabilizing agent by including a known antioxidant for this purpose. Preferred antioxidants include vitamin C and other ascorbates, tocopherols, and the like, and these are provided in an amount effective to reduce or prevent oxidation of compounds that provide the desirable flavor or sensory characteristics of the aroma.

In another embodiment, the stabilizing agent can be combined with another additive prior to being associated with the aroma-providing component. A wide range of different additives can be used for this purpose. Many of these additives can serve a second function as a carrier for the stabilizing agent. The additive can be in a solid or liquid form, and can be a solvent such as water, an oil such as MCT oil or other triglycerides, an emulsion, either water-in-oil or oil-in-water, a flavoring agent, a carbohydrate, a protein, or an antioxidant. Preferred antioxidants for use with coffee and tea aroma are catechins and polyphenols. Additional flavoring agent are typically utilized in very small amounts and are considered as microcomponent additives, whereas carbohydrates, such as sugar and maltodextrin, are added in significantly greater amounts. The antioxidants mentioned above are also suitable candidates for use as carriers for the stabilizing agent or the stabilized aroma-providing component. The stabilized component may also be incorporated in a matrix of oil, water, or other solvents, provided as an emulsion, encapsulated in other edible materials by techniques that are generally known in the art, may be frozen as a frost or dried to powder form prior to storage.

EXAMPLES

The following examples are presented to illustrate the most preferred embodiments of the invention.

Example 1

A roast and ground ("R&G") coffee is extracted with water to form coffee extract. The extract is passed through a steam stripping column where the volatile flavor/aroma components are stripped out, condensed and collected as aroma distillate, with about 80 g aroma distillate collected per 100 g of R&G coffee.

The stripped extract is then concentrated to a solids level of about 55% to provide a coffee base concentrate. A small amount of sodium hydroxide is added to this coffee base concentrate at 0.1% by weight of coffee solids to minimize the acidity development during storage. This final coffee base concentrate is stored separately from the aroma distillate until being used to formulate a beverage.

A stabilizing agent of sodium sulfite ($Na_2SO_3$) is used; 1 g of sodium sulfite in powder form is added to 1000 g of the distillate. This provides a dosage of 508 ppm (or 0.508 g) of $SO_2$ equivalent of sodium sulfite.

The sodium sulfite powder is mixed with the distillate with sufficient agitation to dissolve the sulfite into the distillate liquid. The resulting solution is stored in a sealed container without oxygen headspace that prevents the aroma from permeating out and that prevents excessive amount of oxygen from degrading the aroma.

Both the aroma distillate and the coffee base concentrate are stored separately at room temperature for a period of 6 months. In order to prepare a beverage for consumption, the coffee base concentrate is then mixed with the aroma distillate and hot water is added to the mixture. Upon consumption, the resulting beverage is found to have a flavor that is reminiscent of fresh coffee. In addition, such flavor is even less woody/groundsy/processey than fresh coffee and free of storage off notes despite the relatively long storage time.

Example 2

Sodium sulfite is incorporated in a permeable film that is placed to form a liner for a storage container. The container is then filled with a liquid distillate stream that is obtained according to Example 1 and the container is sealed. The sodium sulfite permeates through the film and into the distillate at an amount of about 0.1%. This occurs during storage of the distillate in the sealed container at room temperature for a period of 6 months. Coffee solids are stored at room temperature separately from the distillate but for the same time period. The coffee solids are then mixed with the distillate and hot water is added to the mixture to form a beverage. Upon consumption, the resulting beverage is found to have a flavor that is reminiscent of fresh coffee, again despite the relatively long storage time.

Example 3

Sodium sulfite is incorporated in a pouch made of paper tea bag and is placed in the storage container of Example 1. The container is then filled with a liquid distillate stream that is obtained according to Example 1 and the container is sealed. The sodium sulfite gradually infuses into the distillate during storage of the container at room temperature for a period of 6 months. Coffee solids are stored at room temperature separately from the distillate but for the same time period. The coffee solids are then mixed with the distillate and hot water is added to the mixture to form a beverage. Upon consumption, the resulting beverage has a flavor that is reminiscent of fresh coffee.

Example 4

An aroma distillate stream is obtained according to Example 1. Gaseous sulfur dioxide is bubbled through the distillate. This provides a equivalent of 500 ppm $SO_2$ in the aroma distillate. The treated distillate is stored in the sealed container of Example 1 at room temperature for a period of 6 months. Coffee solids are stored at room temperature separately from the distillate but for the same time period. The coffee solids are then mixed with the distillate and hot water is added to the mixture to form a beverage. Upon consumption, the resulting beverage is found to have a flavor that is reminiscent of fresh coffee.

Example 5

1 g sodium sulfite powder is mixed with 1000 g of the distillate of Example 1 with sufficient agitation to dissolve the sulfite into the distillate liquid. The distillate is then mixed with less than 1% coffee solids by weight and the resulting mixture is stored in a sealed container at room temperature for a period of 6 months. Separately stored coffee solids are then mixed with the aroma mixture, and thereafter, hot water is added to the mixture to form a beverage. Upon consumption, the beverage is found to have a flavor that is reminiscent of fresh coffee.

Example 6 (Comparative)

Coffee aroma distillate is collected from 2000 g of R&G coffee as in Example 1. The aroma distillate is mixed with coffee base concentrate and the mixture is stored at room temperature for 6 months. The mixture is then added to hot water to form a beverage. Upon consumption, the resulting beverage is found to have a poor flavor resembling stale coffee.

Example 7 (Comparative)

Coffee aroma distillate is collected from a quantity of R&G coffee as in Example 1. The aroma distillate is stored separately from the R&G coffee solids for 6 months. Thereafter, the distillate is mixed with coffee solids and the mixture is then added to hot water to form a beverage. Upon consumption, the resulting beverage is found to have a flavor that is of a lower quality than those for the beverages of Examples 1 to 5 but better than Example 6.

Example 8

The stabilized coffee aroma of Examples 1 to 5 can be encapsulated to form capsules that are stable and easy to handle so that they can be added to the coffee solids at any time during the beverage preparation process. The encapsulated aroma can be added to solids that are already in soluble powder form or can be added as flavoring to a ready to drink beverage or other food product, for example an ice cream composition.

Example 9

Various food products, including powdered coffee mixes, ready to drink beverages, ice-cream, and candy, can be formulated with appropriate amounts of the stabilized coffee aroma of Examples 1 to 5 and 8.

Example 10

R&G coffee is extracted with water to form coffee extract. The extract is passed through a steam stripping column where the volatile flavor/aroma components are stripped out, condensed and collected as aroma distillate.

The stripped extract is then concentrated to a solids level of about 55% to provide a coffee base concentrate. A small amount of sodium hydroxide is added to this coffee base concentrate at 0.1% by weight of coffee solids to minimize the acidity development during storage. This final coffee base concentrate is stored separately from the aroma distillate until being used to formulate a beverage.

A stabilizing agent of cysteine is used; 1 g in powder form is added to 1000 g of the distillate. The cysteine powder is mixed with the distillate with sufficient agitation to dissolve the cysteine into the distillate liquid. The resulting solution is stored in a sealed container that prevents the aroma from permeating out and oxygen from entering.

Both the aroma distillate and the coffee base concentrate are stored separately in separate containers at room temperature for a period of 6 months. In order to prepare a beverage for consumption, the coffee base concentrate is then mixed with the aroma distillate and hot water is added to the mixture. Upon consumption, the resulting beverage is found to have a flavor that is reminiscent of fresh coffee, despite the relatively long storage time.

Example 11

The stabilized coffee aroma of Example 10 can be encapsulated to form capsules that are stable and easy to handle so that they can be added to the coffee solids at any time during the beverage preparation process. The encapsulated aroma is added as a flavoring to a ready to drink chocolate beverage to form a coffee-flavored hot chocolate drink.

Example 12

An aroma distillate stream is obtained according to Example 1. The carbonyls are reduced or removed by enzyme, yeast extract, or further distillation. Then, 5–10 ppm of $SO_2$ equivalent of sodium sulfite powder and 200 μm of catechin are mixed with the distillate with sufficient agitation to dissolve the sulfite and catechin into the distillate liquid. The resulting solution is stored in a sealed container without oxygen headspace that prevents the aroma from permeating out and that prevents excessive amount of oxygen from degrading the aroma.

Both the aroma distillate and the coffee base concentrate are stored separately at room temperature for a period of 6 months. In order to prepare a beverage for consumption, the coffee base concentrate is then mixed with the aroma distillate and hot water is added to the mixture. Upon consumption, the resulting beverage is found to have a flavor that is reminiscent of fresh coffee.

While the preceding Examples were specifically directed to the treatment and stabilization of coffee aroma, it will be immediately realized by one of ordinary skill in the art that aroma distillates from other sources as well as other aroma-providing components that contain aldehydes, pyrroles and other carbonyl-containing compounds may be treated in essentially the same manner in order to be stabilized as disclosed herein. Also, the stabilized aroma-providing components can be added to any one of a wide variety of food or beverage products whether such products are consumed at room temperature, are cooled or frozen or after heating. Typical products include coffee powders, ready to drink beverage mixes, candy, cake frosting, or ice cream along with many others that are limited only by the imagination and creativity of the product formulator.

The term "about," as used herein, should generally be understood to refer to both numbers in a range of numerals. Moreover, all numerical ranges herein should be understood to include each whole integer within the range.

It is to be understood that the invention is not to be limited to the exact configuration as illustrated and described herein. For example, an aroma can be treated to reduce the amounts of carbonyls such as by physical or chemical fractionation, and then can be stabilized according to the present invention with a much lower amount of a nucleophile. Also, the removed carbonyls can be discarded or added back to coffee solids but as a component that is separate from the stabilized aroma. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A process for stabilizing an aroma-providing component against loss or degradation of desirable flavor or sensory characteristics of its aroma during storage which comprises associating with a stabilizing agent an aroma-providing component that is isolated, concentrated or separated from a food, beverage, food-forming or beverage-forming material, wherein the stabilizing agent is a nucleophile that contains at least one atom of sulfur or nitrogen providing at least one lone pair of electrons for reaction, the stabilizing agent being present in an amount effective to chemically interact with undesirable compounds to form a stabilized aroma-providing component which (a) retains a significant portion of one or more of the desirable flavor or sensory characteristics of the aroma in the aroma-containing component during storage, or (b) reduces off flavor generation during storage of the aroma-providing component; and separately storing the stabilized aroma-providing component prior to combining it with a further component of a food, beverage, food-forming or beverage-forming material and optionally with a liquid to form a product for consumption so that, when combining the aroma-providing component with the material to form the product for consumption, the aroma-providing component imparts to the product an improved or enhanced aroma compared to the aroma provided by an unstabilized aroma-providing component.

2. The process of claim 1, wherein the stabilizing agent is present in an amount of between about 1 and 50,000 ppm.

3. The process of claim 1, wherein the stabilizing agent is $SO_2$, a sulfite or a substance that contains or generates a sulfite, a thiol, an amine or an amino acid, and is present in an amount of between about 1 and 20,000 ppm.

4. The process of claim 1, wherein the stabilizing agent comprises cysteine or glutathione or their salts.

5. The process of claim 1, wherein the stabilizing agent is an enzyme present in an amount sufficient to react with aldehyde groups of compounds associated with the aroma-providing component.

6. The process of claim 1, which further comprises providing an antioxidant with the stabilizing agent to help reduce or prevent oxidation of compounds that provide the desirable flavor or sensory characteristics of the aroma.

7. The process of claim 1, wherein the stabilized aroma-providing component is dried to a powder and is stored until a later time when it is reconstituted for consumption by the addition of a liquid.

8. The process of claim 1, wherein the stabilized aroma-providing component is prepared by incorporating the stabilizing agent into a material which is added to the aroma-providing component during storage.

9. The process of claim 1, which further comprises combining the stabilized aroma-providing component with a food-forming or beverage-forming component and a liquid to form a liquid food or beverage product, and drying the liquid product to obtain a solid material that retains the initial flavor or sensory characteristic of the aroma for a time period of at least six months to one year or longer during storage of the powder.

10. The process of claim 1, wherein the stabilized aroma-providing component is formed by passing the aroma-providing component through a porous membrane, film or paper material that contains the stabilizing agent.

11. The process of claim 1, wherein the stabilizing agent is a gas and the stabilized aroma-providing component is formed by passing the gas through or around the aroma-providing component to form the stabilized aroma-providing component.

12. The process of claim 1 wherein the aroma is chocolate or cocoa aroma, tea aroma, malt or Maillard reaction flavor.

13. The process of claim 1, wherein the aroma-providing component is coffee aroma and the stabilizing agent is present in an amount sufficient to react with some or all of the carbonyl groups present in compounds associated with the coffee aroma to reduce or inhibit pyrrole loss from the coffee aroma, or to reduce or inhibit degradation of thiols in the coffee aroma, thus retaining the desirable flavor or sensory characteristics of the coffee aroma during at least six months of storage of the coffee aroma.

14. A process for preparing a food product of an aroma-providing component and a further component of a food, beverage, food-forming or beverage-forming material and optionally a liquid with the product containing an improved or enhanced aroma, which comprises stabilizing the aroma-providing component by the process of claim 1 and separately storing the stabilized aroma-providing component from the further component, and subsequently preparing the food product for consumption by combining the stabilized aroma-providing component and further component, optionally with a liquid, wherein the food product contains an improved or enhanced aroma compared to one prepared with unstabilized aroma-providing component.

15. The process of claim 14, wherein the food product is a beverage, a liquid is used to prepare the beverage, and the aroma is chocolate or cocoa aroma, tea aroma, malt or Maillard reaction flavor.

16. The process of claim 14, which further comprises providing an antioxidant with the stabilizing agent to help reduce or prevent oxidation of compounds that provide the desirable flavor or sensory characteristics of the aroma.

17. The process of claim 14, wherein the aroma-providing component is coffee aroma and the stabilizing agent is present in an amount sufficient to react with some or all of the carbonyl groups present in compounds associated with the coffee aroma to reduce or inhibit pyrrole loss from the coffee aroma, or to reduce or inhibit degradation of thiols in the coffee aroma, thus retaining the desirable flavor or sensory characteristics of the coffee aroma during at least six months of storage of the coffee aroma.

* * * * *